United States Patent [19]
Silva

[11] Patent Number: 6,103,092
[45] Date of Patent: Aug. 15, 2000

[54] METHOD FOR REDUCING METAL ION CONCENTRATION IN BRINE SOLUTION

[75] Inventor: James Manio Silva, Clifton Park, N.Y.

[73] Assignee: General Electric Company, Schenectady, N.Y.

[21] Appl. No.: 09/177,588

[22] Filed: Oct. 23, 1998

[51] Int. Cl.[7] ........................................................ C25B 1/34
[52] U.S. Cl. .................. 205/536; 210/663; 210/668; 210/669; 210/687; 210/688
[58] Field of Search ...................... 205/99, 536; 210/663, 210/668, 669, 687, 688; 423/54, 139, 157

[56] References Cited

U.S. PATENT DOCUMENTS

| | | |
|---|---|---|
| 3,988,223 | 10/1976 | Hirozawa . |
| 4,002,564 | 1/1977 | Carbonel et al. . |
| 4,105,516 | 8/1978 | Martinsons et al. ...................... 204/98 |
| 4,119,508 | 10/1978 | Yokota et al. . |
| 4,242,185 | 12/1980 | McRae . |
| 4,303,704 | 12/1981 | Courduvelis et al. . |
| 4,450,057 | 5/1984 | Kelly . |
| 4,818,773 | 4/1989 | Cornette et al. . |
| 4,895,905 | 1/1990 | Schneider et al. . |
| 5,344,910 | 9/1994 | Sybert ..................................... 528/201 |

FOREIGN PATENT DOCUMENTS

| | | |
|---|---|---|
| 110033 | 6/1984 | European Pat. Off. . |
| 0930498 | 3/1993 | WIPO . |

OTHER PUBLICATIONS

Chemical Abstracts, vol. 113, No. 20, Nov. 12, 1990.
International Search Report No date available.

*Primary Examiner*—Kathryn Gorgos
*Assistant Examiner*—Christopher Keehan
*Attorney, Agent, or Firm*—Sterling B. Brown; Noreen C. Johnson

[57] ABSTRACT

The method reduces the concentration of multivalent metal cations such as calcium, magnesium, iron, nickel, and chromium in brine solution containing a water-soluble metal chelating agent such as sodium gluconate. The method comprises subjecting the brine to primary brine treatment, and then readjusting the brine solution to a pH ranging from about 1.5 to about 5.5, and contacting the brine solution with at least one resin bed comprising a chelating ion exchange resin, typically at a temperature ranging from about 10° C. to about 90° C. and at a flow rate ranging from about 4 to about 32 resin bed volumes per hour; and recovering the brine solution.

24 Claims, No Drawings

METHOD FOR REDUCING METAL ION CONCENTRATION IN BRINE SOLUTION

BACKGROUND OF THE INVENTION

This invention relates to a method for reducing the concentration of multivalent metal cations in a brine solution containing a metal chelating agent. In particular, this invention relates to a method for reducing the concentration of metal cations such as iron, chromium, and nickel in a brine solution derived from a condensation polymer manufacturing process and containing a water-soluble metal chelating agent such as sodium gluconate.

The manufacture of condensation polymers often produces a brine solution as a by-product. For example, a brine solution is produced in the manufacture of polycarbonate resins through the reaction of phosgene with at least one bisphenol compound in an organic solvent in the presence of aqueous sodium hydroxide. A common example is the reaction of bisphenol A with phosgene in dichloromethane in the presence of aqueous sodium hydroxide to produce bisphenol A polycarbonate and sodium chloride solution.

To reduce production costs and avoid environmental pollution, such brine solutions are often recycled to a chlor-alkali plant for electrolysis to produce chlorine gas, sodium hydroxide solution, and hydrogen gas. The electrolysis cells in such chlor-alkali plants frequently comprise an anode compartment and a cathode compartment with an appropriate separator in between the two compartments. The purpose of the separator is to separate the anolyte solution and catholyte solution within the electrolysis cell. The separator may be at least partially porous to water. The types of separators used in electrolysis cells include diaphragms and membranes.

During electrolysis cell operation the separator may gradually become plugged with solid material, retarding the passage of water and dissolved species from anolyte solution to catholyte solution. Separator plugging decreases the efficiency of cell operation and lowers the production rate of products arising from electrolysis. When plugging reaches a critical point, the separator must be replaced, often before its expected life-time is reached. To achieve most economical electrolysis cell operation, it is necessary that the cell separator have as long a life-time as possible.

Brine solutions arising as by-products from condensation polymer manufacture often contain both organic and inorganic contaminants. Organic contaminants may include residual solvent, catalyst, and aqueous-soluble organic species such as monomer and low molecular weight oligomer. Inorganic contaminants may include multivalent alkaline earth and transition metal cations, particularly iron. When brine solution containing one or more such contaminants is electrolyzed, both organic species and metal species may precipitate on the surface of and within an electrolysis cell separator to cause plugging. To achieve maximum life-time of a separator in an electrolysis cell, the concentration of contaminating organic species and multivalent metal cations must be reduced to as low a level as economically possible in the feed-brine solution.

One method for lowering the concentration of organic and inorganic contaminants is known as primary brine treatment. In primary brine treatment, the brine pH is elevated to above about 10 in the presence of a molar excess of carbonate ion in order to precipitate alkaline earth and transition metals as their carbonates and/or hydroxides, followed by a filtering or settling process such as clarification. This is followed by acidification and stripping of the brine to remove carbonate ion as well as organic contaminants such as organic solvents and dissolved catalysts. Additional treatment such as adsorption may be utilized as necessary to remove organic species such as monomer and low molecular weight oligomer from the brine.

This primary brine treatment procedure may be effective for precipitating calcium, magnesium, and iron cations, and substantially reducing their concentration in brine solution as well as reducing the concentration of dissolved organic species. However, it has been found that, when an electrolysis cell is fed brine solution which results from a condensation polymer manufacturing process, such as a polycarbonate manufacturing process, the electrolysis cell separator still becomes plugged at an unexpectedly rapid rate even after the feed-brine solution has been subjected to primary brine treatment.

After careful experimentation it has been discovered that the cause of rapid separator plugging during electrolysis of such brine solution is the precipitation of transition metal species, primarily derived from residual iron, chromium, and nickel in the feed-brine, on the surface of and within the electrolysis cell separator. Analysis has revealed that there is still a very low concentration of transition metal species present in feed brine even after primary brine treatment because of the presence of a water-soluble chelating agent in the brine solution. The chelating agent apparently retains some fraction of the transition metal cations as a water-soluble complex so that these complexed cations are not precipitated as salts during primary brine treatment. The chelating agent is typically a sugar acid such as gluconate anion.

Gluconate anion is often added in the form of sodium gluconate in condensation polymer manufacturing processes to form water soluble complexes with a fraction of the multivalent transition metal cations such as iron (III), nickel (II), and chromium (III). Complexation beneficially hinders transition metal salts from precipitating in the manufacturing equipment and from contaminating the polymer product. With iron (III), for example, gluconate anion forms an iron-gluconate complex, thereby solubilizing iron in the brine solution so that the polymer product is produced substantially free of iron contamination. However, when the brine solution is being purified for recycle to an electrolysis cell, the fraction of a transition metal species such as iron (III) present as a gluconate complex remains strongly chelated, and the transition metal cation concentration in the brine solution may remain at an unacceptable level after brine purification processes such as-primary brine treatment and even after further treatment with cation exchange resins under essentially neutral or alkaline conditions. When brine containing transition metal-gluconate complexes such as the iron-gluconate complex enters an electrolysis cell containing a separator, the gluconate is substantially destroyed, and at least a portion of each transition metal, such as iron, precipitates on the surface of and inside the separator. The precipitated transition metal species gradually plug the separator and force lower production rates from the electrochemical cell and lead to premature separator replacement.

Methods for removing metal cations from an aqueous solution have been reported. Removal of multivalent metal cations from an aqueous solution using a chelating ion exchange resin is known. For example, Yokota et al. (U.S. Pat. No. 4,119,508) employ a chelating ion exchange resin to remove calcium and magnesium cations from a brine solution in the absence of a water-soluble metal chelating agent. Kelly (U.S. Pat. No. 4,450,057) utilizes AMBERLITE® IRC-718 (Rohm and Haas Company) to remove aluminum (III) from brine at pH 2 to 3 in the absence of a water-soluble metal chelating agent. Courduvelis et al. (U.S. Pat. No. 4,303,704) utilize AMBERLITE® IRC-718 resin at either acidic or alkaline pH to recover and reuse very high concentrations of copper or nickel ions from non-brine aqueous solutions derived from an electroless plating process and containing chelating agents such as alkanolamines. However, these methods do not address reducing the concentration of multivalent metal ions in brine solutions derived from a condensation polymer manufacturing process and containing a water-soluble metal chelating agent.

There is thus a need for a method which will substantially reduce the concentration of multivalent metal cations, such as transition metal cations, in brine solution derived from a condensation polymer manufacturing process and containing a water-soluble metal chelating agent. Such a method provides a means to retard plugging of an electrolysis cell separator, such as a diaphragm, by reducing the rate of precipitation of metal species on the surface of and inside the separator, thereby increasing the separator lifetime.

SUMMARY OF THE INVENTION

The present invention addresses the above discussed needs by providing a method for reducing the concentration of multivalent metal cations in a brine solution containing a water-soluble metal chelating agent. The method comprises the steps of:

(a) subjecting the brine to primary brine treatment, which steps comprise
  (i) elevating the brine pH to above about 10 in the presence of a molar excess of carbonate ion relative to calcium,
  (ii) clarifying the brine using a filtering and/or settling process,
  (iii) lowering the brine pH to below about 3,
  (iv) stripping the brine to remove carbonate ion and optionally dissolved organic solvent, and
  (v) optionally treating the brine by adsorption to remove organic species such as monomer and low molecular weight oligomer;
(b) readjusting the brine solution to a pH ranging from about 1.5 to about 5.5;
(c) intimately contacting the brine solution with at least one resin bed comprising a chelating ion exchange resin; and then
(d) recovering the brine solution.

The invention further provides a method to increase the life-time of a diaphragm separator in an electrolysis cell for electrolyzing brine solution containing a water-soluble metal chelating agent.

DETAILED DESCRIPTION

Brine solution, as used in the present invention, comprises an aqueous solution of sodium chloride or potassium chloride. The brine solution may be obtained as a by-product from a condensation polymer manufacturing process. Aqueous sodium chloride is preferred. Representative condensation polymers that can be manufactured by a process which may produce a brine solution as a byproduct include, but are not limited to, polycarbonates, polyesters, polyarylates, polyamides, polyamideimides, polyetherimides, polyethersulfones, polyetherketones, polyetheretherketones, polyarylene sulfides, polyarylene sulfidesulfones, and the like. For example, in polycarbonate manufacture aqueous sodium chloride arises as a byproduct when at least one bisphenol is reacted in an organic solvent with phosgene in the presence of aqueous sodium hydroxide to produce a polycarbonate. Representative polycarbonates and polycarbonate copolymers that can be made by such a process include, but are not limited to, bisphenol A polycarbonate, 3,3',5,5'-teramethyl bisphenol A polycarbonate, and 3,3',5,5'-tetrabromo bisphenol A polycarbonate, and copolymers thereof.

Before recycling to an electrolysis cell, the concentration of sodium chloride in the brine solution may be increased to obtain the most efficient operation of the cell. Sodium chloride concentration in brine solution is conveniently increased by adding make-up salt. Make-up salt is sodium chloride obtained, for example, from natural ground deposits or from evaporation of sea water.

In the brine solution the amount of sodium chloride in solution ranges from a concentration of about 50 grams per liter of solution to about that concentration at which the solution is saturated with sodium chloride at a given temperature. Preferably, the sodium chloride concentration ranges from about 100 to about 320 grams per liter of solution, and more preferably from about 180 to about 315 grams per liter of solution.

Typically the brine solution by-product is separated from the polymer product and, after various treatment steps to increase the concentration of sodium chloride and to remove contaminants, is recycled to an electrolysis cell to produce chlorine gas, sodium hydroxide solution, and hydrogen gas. Suitable electrolysis cells frequently comprise an anode compartment and a cathode compartment with an appropriate separator in between the two compartments to separate the anolyte solution and catholyte solution within the cell. The separator may be at least partially porous to water. Examples of separators used in electrolysis cells include diaphragms and membranes. Diaphragm separators are often composed substantially of asbestos or of polytetrafluoroethylene or of a mixture of asbestos and polytetrafluoroethylene. Membrane separators often comprise an ion exchange resin which selectively passes alkali metal cations, but not anions, from the anolyte solution to the catholyte solution, and which substantially retards back-migration of hydroxide anions from the catholyte solution to the anolyte solution. Electrolysis cells containing diaphragm separators are preferred in the present invention.

Application of electrical current to the cell containing brine solution electrolyzes chloride ions to form chlorine gas in the anode compartment and facilitates the transport of sodium ions through the diaphragm into the cathode compartment where water is electrolyzed to hydrogen gas and hydroxide anion. A solution comprising sodium hydroxide is formed in the cathode compartment and then removed from the cell.

In electrolysis cells containing a diaphragm as the separator, the transport of solution through the diaphragm from the anode compartment to the cathode compartment is facilitated by a difference in liquid level between the two compartments. The liquid level in the anode compartment must be higher than the liquid level in the cathode compartment in order for the passage of solution through the diaphragm to take place efficiently. The difference in liquid levels between the two compartments is referred to as the differential level.

During operation of the electrolysis cell, solid species arising from various brine contaminants, particularly metal species, may gradually deposit on the surface of and within the diaphragm. This causes the cell differential level to increase as the permeability and porosity of the diaphragm decrease. When the differential level increases to a critical value, cell operation is no longer efficient or safe, and the diaphragm must be replaced. Details of this process are given by L. C. Curlin, T. V. Bommaraju, and C. B. Hansson in "Alkali and Chlorine Products: Chlorine and Sodium Hydroxide", Kirk-Othmer Encyclopedia of Chemical Technology, fourth edition, vol. 1, pp. 938–1025 (1991).

To maximize diaphragm lifetime and efficiency of electrolysis cell operation, the brine solution before electrolysis is subjected to purification steps to remove contaminants. Contaminants include both those from the polymer manufacturing process and those from make-up salt, which is often added to brine that is recycled from the polymer manufacturing process. Typical contaminants include phenolic species, organic catalyst and solvent residues, and metal species such as alkaline earth and transition metal cations. Purification steps to remove contaminants include one or more steps of addition of carbonate and hydroxide ion to precipitate metals, clarification, filtration, volatiles stripping, contact with an adsorbent to remove polar organic impurities, and treatments such as ion exchange to reduce the concentration of multivalent metal cations.

Alkaline earth metal cations that are often present in the brine solution include calcium and magnesium. The calcium and magnesium concentrations in the brine solution may each independently be in the range of about 0.005 parts per million (ppm) to about 2000 ppm, preferably in the range of about 0.005 ppm to about 400 ppm, and more preferably in the range of about 0.005 ppm to about 10 ppm. For maximum diaphragm lifetime and efficiency of electrolysis cell operation the concentration of calcium in the brine solution is most preferably in the range of about 0.005 ppm to about 2 ppm, and the concentration of magnesium in the brine solution is most preferably in the range of about 0.005 ppm to about 0.4 ppm.

Transition metal cations that are often present in the brine solution include iron, chromium, and nickel. The iron, chromium, and nickel concentrations in the brine solution may each independently be in the range of about 0.001 ppm to 100 ppm, preferably in the range of about 0.001 ppm to about 10 ppm, and more preferably in the range of about 0.001 ppm to about 2 ppm. For maximum diaphragm lifetime and efficiency of electrolysis cell operation the concentration of iron, chromium, and nickel in the brine solution are most preferably each independently in the range of about 0.001 ppm to about 0.1 ppm.

Brine solutions of the present invention contain a water-soluble metal chelating agent which may form water-soluble complexes with multivalent metal cations, particularly transition metal cations. Typical water-soluble chelating agents include N,N,N',N'-ethylenediamine-tetraacetic acid (EDTA), nitrilotriacetic acid (NTA), gluconic acid, all of their sodium salts. Sodium gluconate is particularly preferred in the brine solutions of this invention. The preferred concentration of water-soluble metal chelating agent in the brine solution is in the range of about 10 ppm to about 2000 ppm, and the more preferred concentration is in the range of about 50 ppm to about 1200 ppm.

The method for reducing the concentration of multivalent metal cations in the present invention comprises first subjecting the brine solution to primary brine treatment. The steps of primary brine treatment comprise adjusting the brine solution to a pH above about 10 in the presence of a molar excess of carbonate ion relative to calcium ion to effect precipitation of a substantial fraction of multivalent metal cations as their salts. Typical means of adjusting the pH to the said range include one or more steps of addition to the brine solution of a sufficient amount of either sodium carbonate or sodium hydroxide or mixtures of sodium carbonate and sodium hydroxide. After precipitation, the brine solution is separated from the precipitate by a convenient means such as clarification, decantation or filtration or a combination of clarification, decantation and filtration.

Typical metal salts that are precipitated above about pH 10 and in the presence of a molar excess of carbonate relative to calcium include calcium, magnesium, and iron salts. The fraction of these metal salts that is precipitated depends upon the initial metal concentrations and upon the pH to which the solution is adjusted. Typically, the concentrations of metal cations such as calcium, magnesium, and iron are reduced by at least 50% in the brine solution following precipitation. However, a fraction of multivalent metal cation contaminants remaining in the brine solution following this precipitation step is present in the form of water-soluble complexes with the metal chelating agent. In particular, a fraction of the iron in the treated brine solution remains as a water-soluble gluconate complex following precipitation. The steps of primary brine treatment do not eliminate a portion of the multivalent metal cation contaminants.

The method of the present invention further comprises readjusting the gluconate-containing brine solution to a pH ranging from about 1.5 to about 5.5, and intimately contacting the brine solution with at least one resin bed comprising a chelating ion exchange resin. A preferred pH range for contacting brine with the resin bed is from about 2 to about 4. Typical means of readjusting the pH to the said range include addition to the brine solution of a sufficient amount of at least one mineral acid. Hydrochloric acid is particularly preferred in the application of the present invention.

Chelating ion exchange resins suitable for use in the present invention include functionalized cross-linked macroporous resins with an ion exchange capacity from about 0.1 milliequivalents of metal ion per milliliter of resin to about 3 milliequivalents of metal ion per milliliter of resin, and preferably from about 0.5 milliequivalents of metal ion per milliliter of resin to about 1.5 milliequivalents of metal ion per milliliter of resin. Preferably, the chelating ion exchange resin is selected from the group consisting of iminodiacetic acid-functionalized polymer resins, amino phosphonic acid-functionalized polymer resins, and carboxylic acid-functionalized polymer resins, and mixtures thereof. Preferred chelating ion exchange resins are iminodiacetic acid-functionalized polystyrene resins. Examples of suitable chelating ion exchange resins include Rohm and Haas AMBERLITE® IRC-718 and Bayer LEWATIT® TP207 resin. Further examples of suitable chelating ion exchange resins may be found in J. H. Hodgkin, "Chelate-Forming Polymers", Encyclopedia of Polymer Science and Engineering, second edition, vol. 3, pp. 363–381 (1985).

Contact of the gluconate-containing brine solution with a chelating ion exchange resin bed may be performed by methods known in the art, such as batch, continuous, or semi-continuous methods. In a preferred method the brine solution is passed through a column containing a bed of chelating ion exchange resin, and the purified brine is recovered for further purification steps or for transfer to the electrolysis cell. Passage of brine through the column may continue until the metal ion complexing capacity of the resin bed is substantially exhausted as shown by an increase in the concentration of contaminating metal ions in brine solution exiting the column. When the metal ion complexing capacity of a resin bed is exhausted, then a fresh resin bed is employed for treatment of further brine solution. Exhausted chelating ion exchange resin beds may be regenerated according to methods known in the art. These include, for example, acid treatment to strip cations from the resin bed followed by base treatment to return the resin to the sodium form prior to being placed back into service. Ion exchange processes are described by C. Dickert in "Ion Exchange" Kirk-Othmer Encyclopedia of Chemical Technology, fourth edition, vol. 14, pp. 760–770 (1995).

In a preferred embodiment of the present invention the brine is intimately contacted with a resin bed in a continuous or semi-continuous process and the flow rate of brine over the resin bed ranges from about 8 resin bed volumes per hour to about 25 resin bed volumes per hour. As used in the present invention, a flow rate expressed as 10 resin bed volumes per hour indicates, for example, that 5 gallons of the brine solution is contacted with 0.5 gallons of a chelating ion exchange resin per hour. A preferred temperature for contacting the brine solution with a chelating ion exchange resin bed ranges from about 20° C. to about 80° C., and a particularly preferred temperature ranges from about 40° C. to about 70° C.

The brine solution recovered from treatment with chelating ion exchange resin contains a significantly reduced concentration of multivalent metal cation contaminants. The amount of metal cations that is removed depends, among other factors, upon the initial metal cation concentrations, the pH to which the brine solution is adjusted, and the volume of chelating ion exchange resin with which the brine solution comes into contact. Typically, the concentrations of iron, chromium, and nickel cations are each reduced by at least 30% in the brine solution following contact with chelating ion exchange resin. A fraction of multivalent metal cation contaminants removed from the thus treated brine was present in the form of water-soluble complexes with a metal chelating agent. In particular, a substantial fraction of the iron removed as a contaminant from the thus treated brine solution was present in the form of a water-soluble gluconate complex.

When brine solution from a polymer manufacturing process treated by the method of the present invention is electrolyzed in an electrolysis cell, the separator in such a cell exhibits a significantly longer lifetime. The increased lifetime is due to the decreased deposition on the surface of and within the separator of solid species derived from contaminating multivalent metal cations in the brine solution. In particular, a diaphragm separator in an electrolysis cell exhibits a significantly longer lifetime using brine treated by the method of the present invention.

The present invention is further described with reference to examples, but it should be construed that the scope of the invention is in no way limited to those examples.

EXAMPLE 1

A brine solution derived from a polycarbonate manufacturing process and containing about 300 ppm of sodium gluconate had the following concentrations of multivalent metal cations: about 3.1 ppm calcium, about 1.5 ppm magnesium, and about 1.9 ppm iron. The brine solution was adjusted to a pH above about 10 using sodium hydroxide and was exposed to about 10 gm/liter sodium carbonate. After filtration of precipitated solids, the recovered brine solution had the following concentration of multivalent metal cations : about 1.2 ppm calcium, about 0.03 ppm magnesium, and about 0.6 ppm iron.

EXAMPLE 2

A resin bed of Rohm and Haas Duolite® C467 resin, a chelating ion exchange resin with amino phosphonic acid group functionality, was prepared in a column. Brine containing about 250 ppm sodium gluconate and 10–13.2 ppm iron was passed through the column at 8 resin bed volumes/hour and at a feed pH of 2.5. The iron removal efficiency was at least 99.4% (inlet 10–13.2 ppm; outlet: less than 0.06 ppm) and the iron breakthrough occurred at 120 hours, at which point the outlet iron concentration exceeded about 0.06 ppm.

EXAMPLE 3

This example illustrates the effect of feed pH on the efficiency of iron removal. The procedure of Example 2 was repeated except that a brine solution containing approximately 0.29 ppm iron and 300 ppm sodium gluconate was passed through the column at 8 resin bed volumes/hour at a feed pH of 10–11. The removal efficiency for iron was typically 41% (inlet: 0.29 ppm; outlet: 0.17 ppm) and iron breakthrough (the point at which no further iron was complexed by the resin) occurred at 32 hours.

EXAMPLE 4

A brine solution was treated by the method of Example 1. This brine solution, containing about 0.5 ppm iron, about 250 ppm sodium gluconate and about 180 grams sodium chloride per liter of solution, was then contacted with an iminodiacetic acid-functionalized chelating ion exchange resin (Bayer LEWATIT® TP207) contained in a column. The feed pH was 3.0, the temperature was 60° C., and the feed rate was 8 resin bed volumes/hour. The recovered brine contained less than 0.06 ppm iron, based on brine solution.

EXAMPLE 5

Diaphragm electrolysis cells were operated using brine solution that was treated with the method of the present invention. The performance of these cells was compared to the performance of cells operated using brine solution that had only been subjected to primary brine treatment (referred to as "brine with primary brine treatment only"). After an average of about 37 weeks of operation, the differential level was measured for each cell. Since there was gradual plugging of the diaphragms, the differential levels after weeks of cell operation increase from the initial differential levels set for most efficient operation. The data are reported as relative differential levels, meaning the percentage of the maximum allowable differential level for safe and efficient operation of the cell. Thus, for example, when the difference in the liquid level between the anode compartment and the cathode compartment is 1 inch and the maximum allowable difference is 10 inches, then this is reported as a relative differential level of 10 percent.

| | Relative Differential Levels | |
|---|---|---|
| Cell Number | Using Brine with Primary Brine Treatment Only | Using Brine Treated by Method of This Invention |
| 1 | 100 | 85 |
| 2 | 100 | 70 |
| 3 | 100 | 50 |
| 4 | 95 | 45 |
| 5 | 100 | 50 |

-continued

| Cell Number | Relative Differential Levels | |
|---|---|---|
| | Using Brine with Primary Brine Treatment Only | Using Brine Treated by Method of This Invention |
| 6 | 70 | 50 |
| 7 | 70 | 55 |
| 8 | 85 | 75 |
| 9 | 80 | 60 |
| 10 | 100 | 55 |
| 11 | 85 | 65 |
| 12 | 100 | 75 |
| 13 | 95 | 65 |
| 14 | 75 | |
| 15 | 100 | |
| 16 | 75 | |
| 17 | 65 | |
| 18 | 90 | |
| | average = 88 | average = 62 |

The average relative differential level was 88% for the 18 cells that were operated using brine with primary brine treatment only to remove multivalent metal cations, whereas the average relative differential level was only 62% for the 13 cells that were operated with brine solution that was treated with the method of the present invention. The data in the above table clearly demonstrate that the set of cells that used brine solution treated by the method of the present invention showed a lower differential level than the set of cells that used brine with primary brine treatment only. For a cell of a given age, a lower differential level is desirable because it implies a longer operating lifetime before diaphragm replacement is necessary.

What is claimed is:

1. A method for reducing the concentration of multivalent metal cations in a brine solution, comprising the steps of:
   (a) subjecting a brine solution containing a water-soluble metal chelating agent to primary brine treatment, which steps comprise:
      (i) elevating the brine pH to above about 10 in the presence of a molar excess of carbonate ion relative to calcium,
      (ii) clarifying the brine using a filtering and/or settling process,
      (iii) lowering the brine pH to below about 3,
      (iv) stripping the brine to remove carbonate ion and optionally dissolved organic solvent, and
      (v) optionally treating the brine by adsorption to remove organic species of monomer and low molecular weight oligomer;
   (b) readjusting the brine solution to a pH ranging from about 1.5 to about 5.5;
   (c) intimately contacting the brine solution with at least one resin bed comprising a chelating ion exchange resin to remove a fraction of multivalent metal cation contaminants that were present in the form of water-soluble complexes with metal chelating agent; and then
   (d) recovering the brine solution.

2. The method of claim 1 wherein the brine solution is derived from a condensation polymer manufacturing process.

3. The method of claim 2 wherein the condensation polymer is a polycarbonate or a polyetherimide.

4. The method of claim 1 wherein the metal cations comprise calcium, magnesium, iron, nickel, and chromium.

5. The method of claim 4 wherein the iron concentration in the brine solution varies from about 0.001 ppm to about 50 ppm.

6. The method of claim 5 wherein the iron concentration in the brine solution varies from about 0.001 ppm to about 0.1 ppm.

7. The method of claim 4 wherein the iron remaining in the brine solution after primary brine treatment is substantially present as a water-soluble metal complex.

8. The method of claim 1 wherein the brine solution comprises about 50 grams sodium chloride per liter of solution to the concentration at which the solution is saturated with sodium chloride at a given temperature.

9. The method of claim 8 wherein the brine solution comprises about 180 grams to about 315 grams sodium chloride per liter of solution.

10. The method of claim 1 wherein the water-soluble metal chelating agent is sodium gluconate.

11. The method of claim 10 wherein the gluconate concentration in the brine solution is in the range from about 10 ppm to about 2000 ppm.

12. The method of claim 11 wherein the gluconate concentration in the brine solution is in the range from about 50 ppm to about 1200 ppm.

13. The method of claim 1 wherein the pH is readjusted to a range from about 2 to about 4 before contacting the brine solution with the resin bed.

14. The method of claim 1 wherein the chelating ion exchange resin has a capacity between about 0.1 to about 3 milliequivalents of metal ion per milliliter of resin.

15. The method of claim 14 wherein the chelating ion exchange resin has a capacity between about 0.5 to about 1.5 milliequivalents of metal ion per milliliter of resin.

16. The method of claim 1 wherein the chelating ion exchange resin is selected from the group consisting of an iminodiacetic acid-functionalized polymer resin, an amino phosphonic acid-functionalized polymer resin, a carboxylic acid-functionalized polymer resin, and mixtures thereof.

17. The method of claim 16 wherein the chelating ion exchange resin is selected from the group consisting of an iminodiacetic acid-functionalized polystyrene resin, an amino phosphonic acid-functionalized polystyrene resin, and mixtures thereof.

18. The method of claim 1 wherein the brine solution is contacted with the resin bed at a temperature ranging from about 10° C. to about 90° C.

19. The method of claim 18 wherein the temperature ranges from about 25° C. to about 80° C.

20. The method of claim 19 wherein the temperature ranges from about 40° C. to about 70° C.

21. The method of claim 1 wherein the brine solution is contacted with the resin bed at a flow rate ranging from about 2 to about 40 resin bed volumes per hour.

22. The method of claim 21 wherein the brine solution is contacted with the resin bed at a flow rate ranging from about 4 to about 25 resin bed volumes per hour.

23. A method for reducing the concentration of multivalent metal cations in a brine solution, said brine solution containing from about 180 to about 315 grams sodium chloride per liter of solution, and from about 50 to about 500 ppm gluconate, said method comprising the steps of:
   (a) subjecting the brine to primary brine treatment, which steps comprise:
      (i) elevating the brine pH to above about 10 in the presence of a molar excess of carbonate ion relative to calcium,
      (ii) clarifying the brine using a filtering and/or settling process,
      (iii) lowering the brine pH to below about 3,
      (iv) stripping the brine to remove carbonate ion and optionally dissolved organic solvent, and (v) optionally treating the brine by adsorption to remove organic species of monomer and low molecular weight oligomer;

(b) readjusting the brine solution to a pH ranging from about 1.5 to about 5.5;

(c) intimately contacting the brine solution with at least one resin bed comprising a chelating ion exchange resin selected from the group consisting of an iminodiacetic acid-functionalized polystyrene resin, and an amino phosphonic acid-functionalized polystyrene resin, at a temperature ranging from about 25° C. to about 80° C., and at a flow rate ranging from about 4 to about 25 resin bed volumes per hour to remove a fraction of multivalent metal cation contaminants that were present in the form of water-soluble complexes with gluconate; and then (d) recovering the brine solution.

24. A method to increase the life-time of a diaphragm separator in an electrolysis cell for electrolyzing brine solution, said brine solution containing from about 180 to about 315 grams sodium chloride per liter of water, and from about 50 to about 500 ppm gluconate, said method comprising the steps of:

(a) subjecting the brine to primary brine treatment, which steps comprise:

(i) elevating the brine pH to above about 10 in the presence of a molar excess of carbonate ion relative to calcium, (ii) clarifying the brine using a filtering and/or settling process, (iii) lowering the brine pH to below about 3, (iv) stripping the brine to remove carbonate ion and optionally dissolved organic solvent, and (v) optionally treating the brine by adsorption to remove organic species of monomer and low molecular weight oligomer;

(b) readjusting the brine solution to a pH ranging from about 1.5 to about 5.5;

(c) contacting the brine solution with at least one resin bed comprising a chelating ion exchange resin selected from the group consisting of an iminodiacetic acid-functionalized polystyrene resin, and an amino phosphonic acid-functionalized polystyrene resin, at a temperature ranging from about 25° C. to about 80° C., and at a flow rate ranging from about 4 to about 25 resin bed volumes per hour to remove a fraction of multivalent metal cation contaminants that were present in the form of water-soluble complexes with gluconate; and (d) recovering the brine solution.

* * * * *